United States Patent Office 2,958,125
Patented Nov. 1, 1960

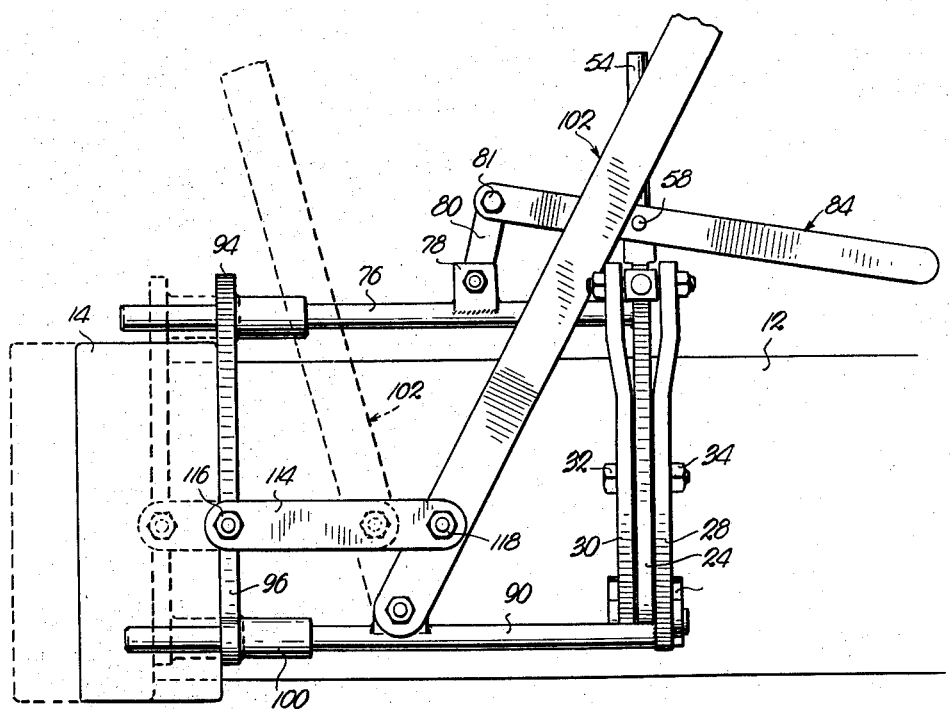
Fig. 2.
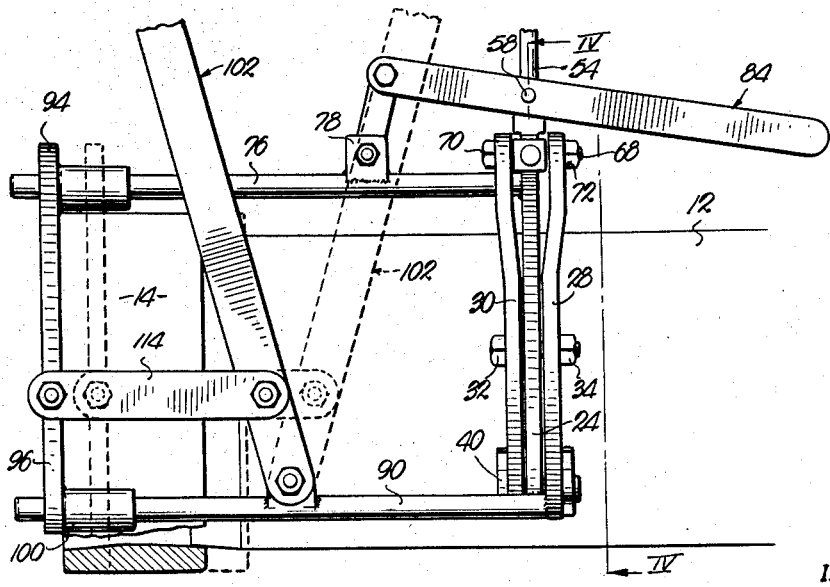
Fig. 3.
INVENTOR.
Willard C. Nichols
BY
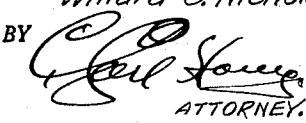
ATTORNEY.

2,958,125
COLLAR SETTER AND PULLER FOR PIPES OF LARGE DIAMETER

Willard C. Nichols, Kansas City, Mo., assignor, by mesne assignments, to The E. H. Wachs Company, Chicago, Ill., a corporation of Illinois Filed Mar. 25, 1957, Ser. No. 648,289

3 Claims. (Cl. 29—237)

This invention relates to the pipe laying art and more particularly, to a device uniquely adapted for emplacing a cylindrical collar upon a large diameter pipe section and for removing a collar of this nature from such a section.

Non-metallic, composition-type pipe sections have been manufactured for some time and are becoming of increasing importance because of the widespread use thereof, such pipes having a diameter of the order of eight to twelve inches. Sections of pipe made of synthetic or composition materials are conventionally interconnected by annular, band-like collars constructed of similar substances and which are adapted to be slipped over the ends of adjacent pipes so as to form interconnection between the pipes. It generally has been found desirable to attach these collars to adjacent ends of pipe sections by use of an adhesive which bonds the collar to the outer surface of the pipe section. These adhesives serve the dual function of acting as a lubricant during emplacement of the collar upon a pipe and subsequently drying to form a strong cohesive bond between the collar and the section.

However, the inner diameter of the collars is normally so close to being equal to the outer diameter of the pipe sections that considerable force is required to pull a collar upon the end of a pipe section even when the lubricating-type adhesive as described above is utilized. Also, once the lubricating material has set up to form an adhesive bond, it has heretofore been virtually impossible to remove such bonded collars from a pipe section without breaking the same. Since the collars are relatively expensive and it is usually necessary to break two of the collars in order to replace any one pipe section, it is manifest that there has existed a great need for mechanical means to remove collars from composition-type pipes without breaking either the pipe or the collar.

It is therefore the most important object of this invention to provide a device for emplacing on or removing a generally cylindrical collar from a composition-type pipe section without in any manner damaging either the section or the collar.

An equally important object of this invention is to provide a collar setter and puller for composition pipes of large diameter which is adapted to be secured to such pipes while the same are still partially buried in the ground, and without the necessity of completely digging out the earth surrounding the pipe on all sides as has heretofore been necessary.

Another important object is to provide a collar setter and puller which is adapted to rest upon and only partially embrace a pipe section adjacent an extremity thereof, and which has unique shiftable means thereon for quickly and efficiently emplacing a collar upon or removing the same from the end of a pipe section.

Another important object of this invention is to provide a collar setter and puller for composition-type pipe sections wherein the device has novel clamping means for gripping the pipe to efficiently secure the structure to the section without in any manner damaging the pipe to which the device is attached.

A further important aim of this invention is to provide a collar puller and setter for large diameter composition pipes which is especially adapted to perform four different types of operation, namely, to (1) pull a collar on a pipe section, (2) push a collar off a pipe section, (3) pull another pipe into a collar upon which another pipe section has already been placed, and (4) push another pipe out of a collar upon which another section has been placed.

Although the invention has been referred to herein as having particular applicability to composition pipes, which would include those formed of concrete, vitrified clay, asbestos-cement and the like, its utility is not so limited, and it should be understood that the use of the invention with all types of pipes using pressure coupled joints, whether the pipe and collar parts are of composition material, cast iron or other construction, is contemplated.

Other important objects of this invention relate to unique constructional components such as toggle mechanism connected to the clamp arms and adapted to move frictional surfaces on the clamps into engagement with the pipe section upon straightening of the toggle linkage, to thereby cause the device to be firmly and substantially immovably secured to the pipe section without damaging the same; to the provision of novel lever structure connected to the member for moving the collar to accomplish a great advantage in movement of the collar either upon or off of a pipe section; to the provision of a device which is purely mechanical in operation so as to preclude the necessity of hydraulic lines, units, or other parts in the nature of chains or the like; and to other details of construction which will become obvious or be described more fully hereinafter.

In the drawings:

Fig. 2 is a fragmentary, side elevational view showing the manner in which a collar puller and setter as shown in Fig. 1 is utilized to remove a cylindrical collar from a large diameter pipe section, one position of the collar setting lever being shown in phantom;

Fig. 3 is a fragmentary, side elevational view similar to Fig. 2 illustrating the manner in which the collar puller and setter is utilized to emplace a cylindrical collar on a pipe section, the other end of the path of travel of the collar setting lever being shown in phantom;

Fig. 4 is a fragmentary, front elevational, partial cross-sectional view showing the manner in which the device normally rests upon and partially embraces a pipe section, taken on irregular line IV—IV of Fig. 3 and looking in the direction of the arrows;

Fig. 5 is a cross-sectional view taken on line V—V of Fig. 4 and looking in the direction of the arrows;

Fig. 6 is a fragmentary, reduced, rear elevational view of the collar puller and setter showing a modification of the instant invention adapting the device for use with smaller diameter pipe sections; and Fig. 7 is a fragmentary, reduced, front elevational view of a collar puller and setter also adapted for smaller diameter pipe sections.

Figure 1:
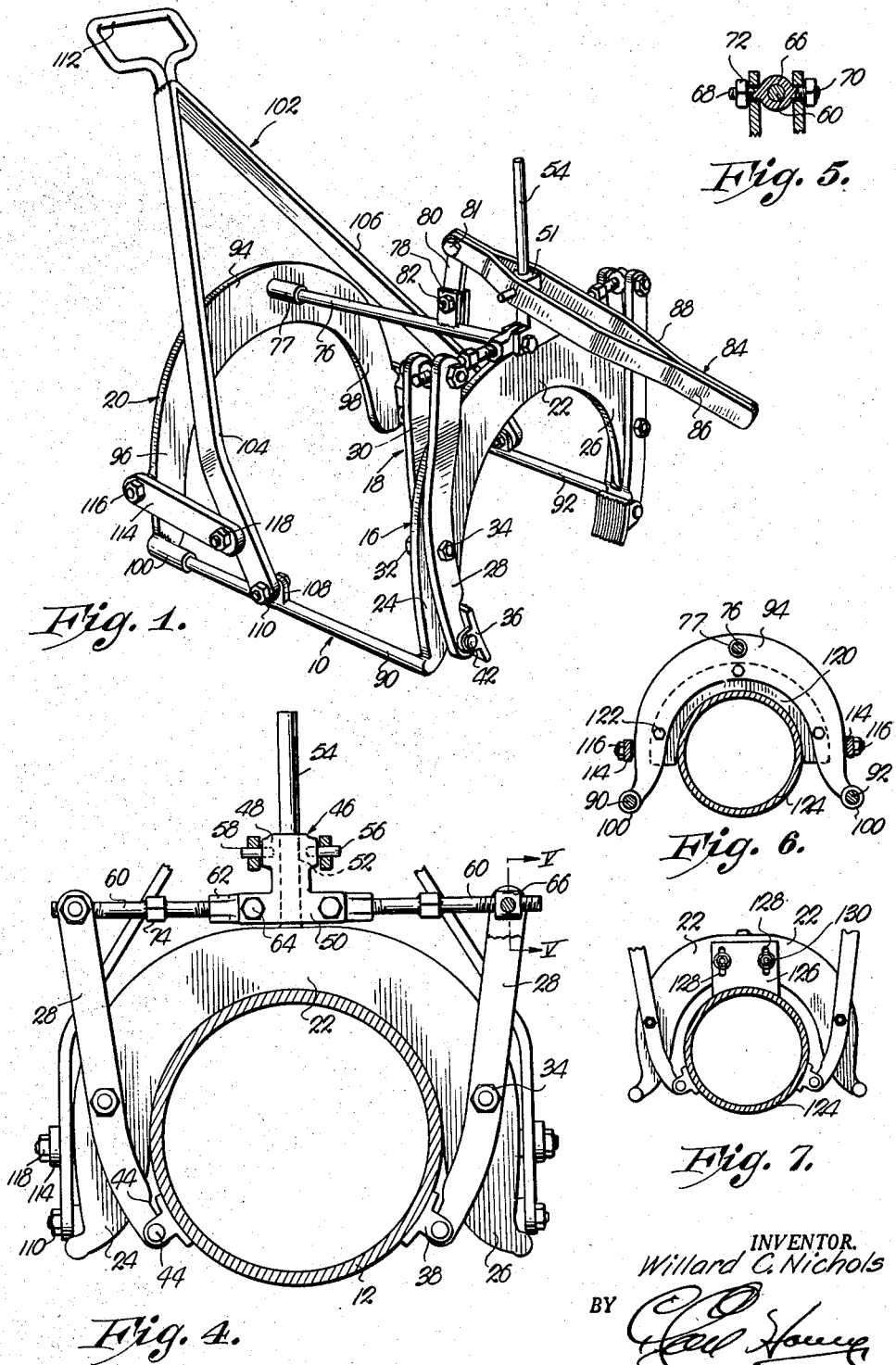
Figure 1 is a side perspective view taken from slightly above the device illustrating one form of a collar setter and puller for large diameter, composition-type pipe sections constructed in accordance with the concepts of the instant invention.

A collar pulling and setting device, generally designated by the numeral 10, is shown resting upon and partially embracing an elongated, composition-type pipe section 12 adjacent one extremity of the latter. Device 10 is particularly adapted for emplacing a generally cylindrical collar 14 upon pipe section 12 and for additionally removing a collar such as 14 from pipe sections in the nature of composition type 12. As is clearly shown in Figs. 2, 3 and 4 of the drawings, device 10 only partially embraces pipe section 12 and therefore, is particularly advantageous in setting on and pulling collars from a pipe section while the latter is still partially buried in the ground. In other words, a collar 14 may be removed from or placed on section 12 by merely digging down to the pipe 12 and around the sides thereof, without the necessity of clearing earth away from all sides of the pipe as has been necessary in the past when chain means or the like were employed and which had to be secured to the pipe section around the entire circumference thereof.

Basically, device 10 comprises U-shaped structure broadly designated 16, shiftable mechanism 18 having parts moveable into gripping relationship with pipe 12, and a shiftable assembly 20 which includes a member adapted to engage either end of a collar 14 disposed at one extremity of section 12 and adapted to effect the desired emplacement of collar 14 upon or removal of the latter from the end of section 12 upon shifting of assembly 20.

More specifically, device 10 comprises a forward U-shaped, flat plate 22 having a pair of depending legs 24 and 26. As is evident from Figs. 1 and 4, plate 22 is constructed so as to have a circular inner edge adapted to rest upon and conform to the outermost surface of section 12 and thereby rest firmly against pipe section 12. Shiftable mechanism 18 mounted on plate 22 preferably comprises clamping mechanism including a clamp on each of the legs 24 and 26 respectively. Each of the clamps may be constructed of a pair of elongated, flat elements 28 and 30 which have an opening therein for receiving a bolt 32 therein. It is to be noted that an opening is provided in each of the legs 24 and 26 respectively for receiving the bolts 32 and therefore, it can be perceived that the elements 28 and 30 pivot about bolt 32 which is held in position by virtue of a nut 34 threaded thereon. Pivotally mounted on the lowermost ends of each of the elements 28 and 30 is a frictional grip 36 having a pair of laterally extending flanges 38 and 40 thereon which are adapted to overlie the outermost surfaces of the lowermost ends of elements 28 and 30. It can be perceived that grips 36 are pivotal on a pin 42 passing through flanges 38 and 40, and elements 28 and 30. As indicated in Fig. 4, it is desirable to cut away a portion of each of the elements 28 and 30 as at 44 so as to provide clearance for one end of the grip 36.

The outermost, pipe-engaging surfaces of the grips 36 are preferably scored so as to provide a plurality of upstanding lugs which are adapted to engage the outermost surface of pipe section 12 without in any manner damaging the latter and causing deleterious effects on the pipe.

Also forming a part of shiftable mechanism 18 is toggle means broadly designated by the numeral 46 and which preferably includes a T-shaped component having a base leg 48 and a cross leg 50. Referring to Fig. 1, it can be seen that a cubical block 51 is secured to base leg 48 of T-shaped component, it further being perceived that block 51 is provided with a bore 52 for reciprocably receiving an upright standard 54 which is welded or otherwise secured to the uppermost portion of plate 22. A pair of axially aligned pins 56 and 58 are pivotally received in suitable openings provided therefor in cubical block 51, the pins 58 and 56 being secured to the arms of a lever to be hereinafter described. It is to be noted that pins 56 and 58 preferably lie in a plane parallel to one passing through plate 22.

Pivotally connected to each of the outermost ends of cross leg 50 is an elongated rod 60. It can be perceived that each of the rods 60 is threaded into a header 62 which is in turn pivotally mounted on one end of cross leg 50 by virtue of a bolt 64. The outermost end of each of the rods 60 is threadably mounted in a cylindrical connector head 66. From Figs. 3, 4 and 5 it can be seen that cylindrical nodule 66 is disposed between the uppermost ends of elements 28 and 30 and is pivotal on a pair of axially aligned, integral, opposed pins 68 and 70 which have nuts 72 disposed thereon. Also provided on rod 60 intermediate its end is a wrench-receiving lug 74.

An elongated rod 76 interconnects the uppermost portion of assembly 20 and the bight of U-shaped plate 22. Located on the innermost face of assembly 20 is a bearing 77 which reciprocally receives rod 76. Disposed on rod 76 intermediate its ends are a pair of upright bosses 78 adapted to pivotally receive a link 80. It is apparent that link 80 is pivotally mounted between bosses 78 by virtue of bolt and nut means 82 passing through the lowermost end of link 80 and the bosses 78, and a toggle lever 84 is provided for moving base leg 48 along a vertical path of travel. Lever 84 comprises a pair of elongated members 86 and 88 respectively which are welded together at their outermost ends and bent to form a pair of spaced parallel sections which receive the block 51 therebetween. As seen in Figs. 1, 2 and 3, each of the members 86 and 88 has an opening in which the pins 56 and 58 respectively are secured so that upon vertical movement of lever 84 and block 51 the same reciprocate relative to standard 54. It is also of note that the end of lever 84 adjacent link 80 is pivotally attached to the latter by virtue of bolt and nut means 81.

Means for interconnecting structure 16 and assembly 20 in addition to rod 76 may conveniently take the form of a pair of elongated rods 90 and 92 respectively, it being noted that the rods 90 and 92 are welded to the lowermost ends of the legs 24 and 26 respectively and extend rearwardly from plate 22 in one direction. It is of importance that when device 10 is emplaced on section 12 that rods 90 and 92 lie alongside section 12 in substantial parallelism therewith.

Shiftable assembly 20 includes a C-shaped flat member 94 having a pair of legs 96 and 98, it being noted that the inner peripheral edge of member 94 is substantially semi-circular so as to also conform with the outermost surface of section 12. Secured to the lowermost end of each of the legs 96 and 98 respectively is a cylindrical bearing 100, each of which extends forwardly from member 94 and which is adapted to reciprocably receive a corresponding rod 90 or 92. It can now be seen that because bearings 100 ride on respective rods 90 and 92, assembly 20 is reciprocable with respect to structure 16 on the rods 90 and 92.

A V-shaped lever 102 having a pair of shanks 104 and 106 is additionally provided and, as shown in Figs. 1, 2 and 3, each of the lowermost ends of shanks 104 and 106 is pivotally secured to an upright boss 108 which is welded to a corresponding rod 90 or 92 intermediate its ends. A bolt 110 passing through the lowermost end of a shank 104 or 106 and boss 108 allows swinging of lever 102 with respect to rods 90 and 92. Although not required, it is convenient to provide a closed loop handle 112 on the uppermost end of lever 102 and thereby permit greater pressure to be placed on collars 14 in removal or emplacement of the latter. Linkage for interconnecting leg 96 and shank 104 and leg 98 with shank 106 may take the form of a short, flat, elongated bar 114 pivotally secured to leg 96, for example by a bolt 116 and, by the same token, to shank 104 or shank 106 by a bolt 118.

As hereinabove pointed out, device 10 is adapted to be placed upon and partially embrace a pipe section 12 in order to remove from or set a collar 14 thereon, and thus device 10 is placed on pipe section 12 with plate 22 and member 94 straddling the section. When the device 10 has been positioned in the correct place relative to an extremity of section 12, the outermost end of lever 84 is swung downwardly so as to reciprocate block 51 on standard 54 and push base leg 48 downwardly and thus bring the rods 60 into linear alignment. Forcing rods 60 into linear alignment moves the uppermost ends of the clamping elements outwardly with respect to each other. As the uppermost ends of the clamping elements are moved outwardly, grips 36 are brought into frictional engagement with a portion of pipe section 12 to rigidly secure device 10 to section 12.

Thereupon, handle 112 is grasped and either moves toward plate 22 or toward member 94 depending upon whether a collar 14 is being placed upon or removed from section 12.

Device 10 is particularly adapted for carrying out four different operations with respect to removing and setting collars 14 and in this respect, the various operations will be described in greater detail.

One operation for which device 10 is adapted is to pull a collar 14 on one end of a pipe section 12. This operation is illustrated in Fig. 3 of the drawings where it can be seen that device 10 is secured to section 12 by virtue of shiftable mechanism 18 after V-shaped lever 102 has been swung to its path of travel adjacent the rear portion of device 10. Collar 14 is disposed between member 94 and the adjacent extremity of section 12 and therefore, upon forward movement of lever 102, member 94 bearing on the peripheral edge of collar 14, reciprocates collar 14 with respect to section 12 and causes collar 14 to be forced onto the proximate end of section 12.

A second operation which may be performed by device 10 consists of pushing a collar 14 off a pipe section 12 and this is illustrated in Fig. 2 of the drawings wherein it can be seen that lever 102 is disposed in its forwardmost position with the outermost face of member 94 disposed against the peripheral edge of collar 14. Upon movement of lever 102 in a rearward direction toward member 94, the latter pushes collar 14 off of section 12.

A third operation which may be conducted with device 10 consists of pulling another pipe section into a collar 14 which has just been or is already emplaced on section 12. In this third operation, device 10 is disposed with member 94 located on the outermost peripheral edge of collar 14 which is disposed on section 12, and the clamping mechanism 18 is located outwardly from the collar 14 and remote from the extremity of section 12 upon which collar 14 is placed. Then another pipe section is placed in position against the open end of collar 14 with plate 22 straddling the new section to be placed in collar 14. Lever 84 is swung downwardly to cause shiftable mechanism 18 to securely clamp the new section to device 10, and the V-shaped lever 102 is swung from its position at the forwardmost end of its path of travel, rearwardly toward plate 22 to thereby push the new section into collar 14.

The fourth operation which may be performed with device 10 is similar to operation 3, only another pipe section is pushed out of collar 14. Device 10 is disposed in the same position as described in operation 3, with the exception that lever 102 is disposed initially at the rearwardmost end of its path of travel and the section 12 is pulled out of collar 14 by pushing the lever 102 toward plate 22 and the forward end of its path of travel.

It can now be seen that device 10 is uniquely adapted for carrying out the four different operations above described, thus precluding the necessity of breaking collars 14 off of sections 12 in order to repair sections 12, resulting in a great saving of time, equipment and parts to remove and set collars from pipe sections. Device 10 is of simple, rugged construction and thus is not subject to breakdown as is the case in hydraulic mechanisms requiring complicated components and as is also the case with structures employing attaching chains and the like. Furthermore, the earth surrounding section 12 need not be removed around the entire circumference thereof and thus a great saving is effected in labor preparatory to putting on or removing collars from section 12.

Device 10 may also be used to set collars on pipe sections smaller than pipe section 12 and a modified form of the invention is shown in Figs. 6 and 7, wherein is provided shim means for adapting the device 10 to be utilized with pipe of substantially smaller diameter. A C-shaped shim 120 is secured to member 94 by bolt and nut means 122, it being noted that the innermost peripheral edge of shim 120 is of suitable configuration to conform with the outermost surface of pipe 124, and a smaller shim 126 is adjustably mounted on plate 22 to rest on the outermost surface of pipe section 124. Elongated slots 128 are provided in shim 126 and which receive nut and bolt means 130. In this manner, shim 126 may be reciprocated vertically with respect to plate 22 in order to make the same adaptable for various sizes of pipe sections 124.

Having thus described the invention what is claimed as new and desired to be secured by Letters Patent is:

1. A device for emplacing a generally cylindrical collar having a substantially smooth, external surface upon a large diameter pipe section and for removing such a collar from such a section, said device comprising: U-shaped structure adapted for resting upon and only partially embracing such a pipe section adjacent an extremity thereof; clamping mechanism adapted to partially embrace the pipe section and including a pair of opposed clamps having gripping surfaces; means pivotally mounting each of the clamps on the structure in a normally upright position with said surfaces disposed below the point of pivoting and in substantially opposed relationship to each other; toggle mechanism reciprocably mounted on said structure and including a T-shaped part having a cross leg and a base leg, and a rod pivotally connected to and extending outwardly from each end of the cross leg, each of said rods being pivotally connected to the uppermost end of a corresponding clamp, said rods being of sufficient length that, when said mechanism is reciprocated in one direction, the rods are moved toward positions in linear alignment and said surfaces are shifted to a position firmly gripping the section to immovably secure the structure to the section; an elongated arm swingably mounted at one end thereof on said structure and pivotally connected intermediate the ends thereof to said base leg for reciprocating said mechanism; an assembly shiftably mounted on the structure and including a downwardly open, flat, C-shaped member adapted to engage either end of such a cylindrical collar disposed at said extremity of the section; and means on the structure and operably coupled with the assembly for shifting the latter relative to the structure and thereby relative to the pipe section to effect the desired emplacement of the collar upon or removal of the latter from said extremity of the section.

2. The invention of claim 1, wherein said base leg is provided with an axial bore therethrough, said structure including an elongated, upright, centrally disposed standard, said standard being received within said bore to thereby reciprocably mount said mechanism on said structure.

3. The invention of claim 1, wherein said shifting means operably coupled with said assembly includes a lever pivotally connected at one end thereof to said structure and pivotally connected intermediate the ends thereof to said C-shaped member.

References Cited in the file of this patent

UNITED STATES PATENTS

| | | |
|---|---|---|
| 409,008 | Breymann | Aug. 13, 1889 |
| 1,249,947 | Gilbert | Dec. 11, 1917 |
| 2,654,569 | Cooper | Oct. 6, 1953 |
| 2,670,174 | Lucker | Feb. 23, 1954 |
| 2,674,966 | Morris | Apr. 13, 1954 |
| 2,692,159 | Croswell | Oct. 19, 1954 |
| 2,719,695 | McKee | Oct. 4, 1955 |
| 2,761,952 | Totten | Sept. 4, 1956 |

FOREIGN PATENTS

| | | |
|---|---|---|
| 1,119,300 | France | Apr. 3, 1956 |